US007265660B2

(12) United States Patent
Watanabe

(10) Patent No.: US 7,265,660 B2
(45) Date of Patent: Sep. 4, 2007

(54) TIRE PRESSURE DETECTING APPARATUS

(75) Inventor: Hiroshi Watanabe, Honjo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/734,595

(22) Filed: Dec. 15, 2003

(65) Prior Publication Data
US 2004/0178899 A1 Sep. 16, 2004

(30) Foreign Application Priority Data
Dec. 16, 2002 (JP) .......................... P 2002-363703

(51) Int. Cl.
A60C 23/00 (2006.01)
(52) U.S. Cl. ..................... 340/447; 340/442; 73/146.4; 73/146.5
(58) Field of Classification Search ................ 340/443, 340/438, 439, 442, 445, 449, 447; 152/416; 73/146.5, 146.2, 146.8; 374/143
See application file for complete search history.

(56) References Cited

U.S. PATENT DOCUMENTS

| 5,436,612 | A | * | 7/1995 | Aduddell ..................... 340/438 |
| 5,602,524 | A | * | 2/1997 | Mock et al. ................. 340/447 |
| 5,612,671 | A | * | 3/1997 | Mendez et al. ............. 340/447 |
| 5,708,411 | A | * | 1/1998 | Hill ............................ 340/447 |
| 5,883,305 | A | * | 3/1999 | Jo et al. ..................... 73/146.5 |
| 6,018,993 | A | | 2/2000 | Normann et al. |
| 6,034,597 | A | | 3/2000 | Normann et al. |
| 6,112,585 | A | | 9/2000 | Schrottle et al. |
| 6,181,241 | B1 | | 1/2001 | Normann et al. |
| 6,194,999 | B1 | | 2/2001 | Uhl et al. |
| 6,693,522 | B2 | * | 2/2004 | Tang et al. .................. 340/445 |
| 6,705,155 | B2 | * | 3/2004 | Katou ......................... 73/146 |
| 6,788,194 | B2 | * | 9/2004 | Yamashita ................... 340/447 |
| 6,861,950 | B2 | * | 3/2005 | Katou ......................... 340/447 |
| 6,972,671 | B2 | | 12/2005 | Normann et al. |
| 6,972,691 | B2 | * | 12/2005 | Okubo ................... 340/870.07 |
| 7,010,968 | B2 | * | 3/2006 | Stewart et al. ................. 73/146 |
| 2003/0164759 | A1 | * | 9/2003 | Nantz et al. ................. 340/442 |
| 2003/0164760 | A1 | * | 9/2003 | Nantz et al. ................. 340/447 |
| 2003/0197603 | A1 | | 10/2003 | Stewart et al. |
| 2004/0066289 | A1 | * | 4/2004 | Lin ............................ 340/447 |
| 2004/0127192 | A1 | * | 7/2004 | Ceresoli et al. ............. 455/405 |

FOREIGN PATENT DOCUMENTS

DE 4232240 A1 * 3/1994

(Continued)

Primary Examiner—Russell D. Stormer
(74) Attorney, Agent, or Firm—Foley & Lardner LLP

(57) ABSTRACT

A tire pressure detecting apparatus detects the pressure and location of a tire in a vehicle and notifies a person in the vehicle of each tire pressure and the location of the tire linked with the tire pressure. Terminals are arranged on the tires of the vehicle, respectively. Receivers are arranged in the vicinities of the tires, to receive tire pressure data signals transmitted from the terminals and measure reception levels of the received signals. An ECU is connected to receive the tire pressure data and signal levels from the receivers. The ECU obtains only one piece of the tire pressure data having a maximum signal level from the receiver showing the maximum signal level and relates the obtained tire pressure data is of the tire with the maximum-signal-level receiver. A display displays the pressure and location of each tire determined by the ECU.

8 Claims, 4 Drawing Sheets

FOREIGN PATENT DOCUMENTS

| | | |
|---|---|---|
| DE | 195 34 616 A1 | 3/1997 |
| EP | 1 219 472 A2 | 7/2002 |
| JP | 10-104103 | 4/1998 |
| JP | 2001-322411 A | 11/2001 |
| JP | 2002-257661 | 9/2002 |
| JP | 2003-118333 | 4/2003 |
| WO | WO 93/16891 | 9/1993 |
| WO | WO 01/70520 A1 | 9/2001 |
| WO | WO 03/089260 A1 | 10/2003 |

* cited by examiner

TIRE PRESSURE DETECTING APPARATUS

CROSS REFERENCE TO RELATED APPLICATION

This application claims benefit of priority under 35 U.S.C. § 119 to Japanese Patent Application No. 2002-363703, filed on Dec. 16, 2002, the entire contents of which are incorporated by reference herein.

BACKGROUND OF THE INVENTION

1. Field of the Invention

The present invention relates to a tire pressure detecting apparatus installed in a vehicle to detect tire pressures.

2. Description of the Related Art

In recent years, vehicles provided with pneumatic tires have tended to be equipped with tire pressure detecting apparatuses for the improvement of driving safety which detect tire pressures, transmit the detected tire pressures to ECUs (electronic control units) arranged in the vehicles, and notify persons in the vehicle of the tire pressures.

An example of a tire pressure detecting apparatus is disclosed in Japanese Unexamined Patent Application Publication No. 2001-322411. This related art arranges a tire pressure sensor with a transmitter on each tire of a vehicle. Tire pressure data measured with the sensors is transmitted on radio waves. The tire pressure data is received by a receiver through antennas that are arranged for each tire, respectively. The data is then displayed on a display unit installed in the vehicle.

According to the related art, the single receiver receives tire pressure data for all tires (four in a four-wheel vehicle) transmitted from the tire pressure sensors that are arranged on each tire, respectively. This receiver has difficulty identifying which data corresponds to which tire. Namely, the related art may detect an abnormal tire pressure but is difficult to tell which of the tires has caused the abnormality.

To solve this problem, there is an idea that allocates an ID for each tire pressure sensor installed on each tire of a vehicle and reads the IDs through a receiver. This technique may identify the respective IDs of the sensors to distinguish the tires themselves from each other but is unable to specify the respective positions of the tires in the vehicle based on the sensor IDs. When a tire rotation is carried out to change the positions of the tires in the vehicle, it is difficult for this idea to specify the positions of the tires in the vehicle based on the IDs. In most cases, the driver of a vehicle expects to know the pressure of a given tire and the position thereof in the vehicle instead of identifying the tire itself.

SUMMARY

To solve these problems, the present invention provides a tire pressure detecting apparatus having a simple structure capable of specifying the positions of tires as fitted to a vehicle without making a receiver identify tire pressure sensors installed on the tires and capable of providing the driver of the vehicle with measured tire pressures linked with the tire positions.

In order to accomplish the object, an aspect of the present invention provides a tire pressure detecting apparatus for a vehicle, including a terminal attached to each tire of the vehicle and having a tire pressure sensor to detect a tire pressure and a transmitter to transmit tire pressure data based on the detected tire pressure, a receiver attached to a part of the vehicle in the vicinity of each tire to receive tire pressure data transmitted from any one of the transmitters and detect a reception level of the received tire pressure data, and a controller to obtain tire pressure data from one of the receivers that has a highest one of the detected reception levels and determine that the obtained tire pressure data is of the tire corresponding to the highest-reception-level receiver.

DESCRIPTION OF THE PREFERRED EMBODIMENT

Figure 1:
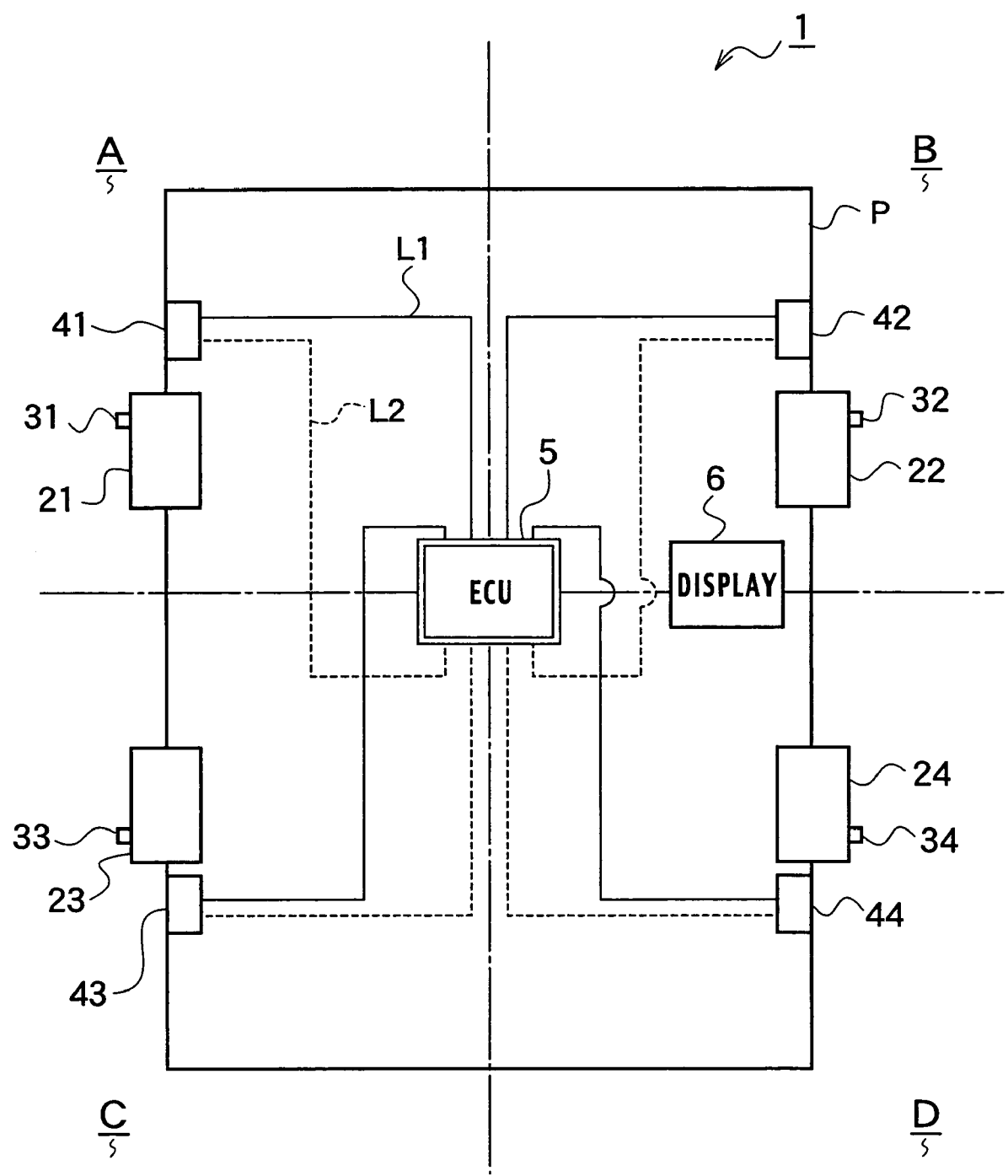
FIG. 1 is a block diagram schematically showing a vehicle in which a tire pressure detecting apparatus according to an embodiment of the present invention is installed.

An embodiment of the present invention will be explained with reference to the accompanying drawings. FIG. 1 is a block diagram schematically showing a vehicle in which a tire pressure detecting apparatus 1 according to an embodiment of the present invention is installed. The tire pressure detecting apparatus 1 has terminals 31 to 34 installed on four tires 21 to 24 of the vehicle P, respectively. Each of the terminals 31 to 34 has a tire pressure sensor to detect a tire pressure of a corresponding one of the tires 21 to 24 and a transmitter to transmit tire pressure data based on the detected tire pressure on a radio signal.

Receivers 41 to 44 are arranged on the vehicle P in the vicinities of the tires 21 to 24, respectively, to receive a tire pressure data signal transmitted from any one of the terminals 31 to 34. The receivers 41 to 44 communicate with an ECU (electronic control unit) 5 serving as a control center. The ECU 5 is connected to a display 6 that displays tire pressure data of the tires 21 to 24 and the locations of the tires 21 to 24 in the vehicle P related to the tire pressure data.

Figure 2:
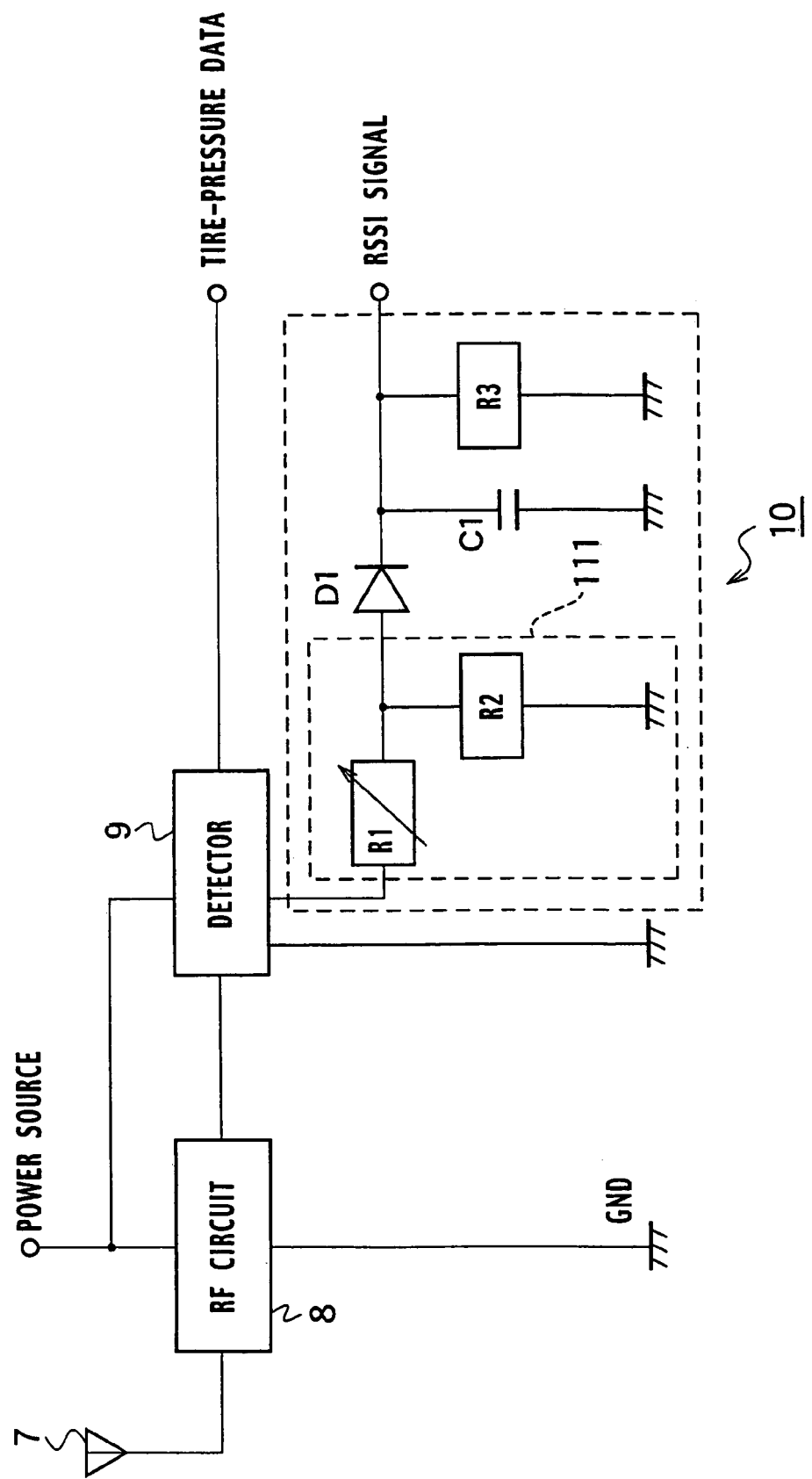
FIG. 2 is a circuit diagram showing the details of a receiver of the tire pressure detecting apparatus.

FIG. 2 is a circuit diagram showing the details of one of the receivers 41 to 44. The receiver has an antenna 7, an RF (radio frequency) circuit 8, and a detector 9. The antenna 7 receives a signal transmitted from any one of the terminals 31 to 34 and passes the received signal to the detector 9 through the RF circuit 8. The detector 9 demodulates the signal to provide tire pressure data as an analog signal or a digital signal. This signal is transferred to the ECU 5 through a tire pressure data line L1 as shown in FIG. 1.

The output signal from the detector 9 is also supplied to an RSSI (radio signal strength indicator) 10. The RSSI 10 has a voltage divider 111 composed of a variable resistor R1 and a resistor R2, a resistor R3, a diode D1, and a capacitor C1. The RSSI 10 level-adjusts, rectifies, and smoothes the output signal from the detector 9, to provide the strength of an electric field of the received signal, i.e., a reception level of the received signal. According to this embodiment, the voltaged divider 111 is a potentiometer composed of the variable resistor R1 and resistor R2. The structure of the voltage divider 111 is not limited to the one shown in FIG. 2. The voltage divider 111 may have any structure if it provides an attenuator function.

The RSSI signal provided by the RSSI 10 is transferred to the ECU 5 through an electric field strength line L2 shown in FIG. 1.

Figure 3:
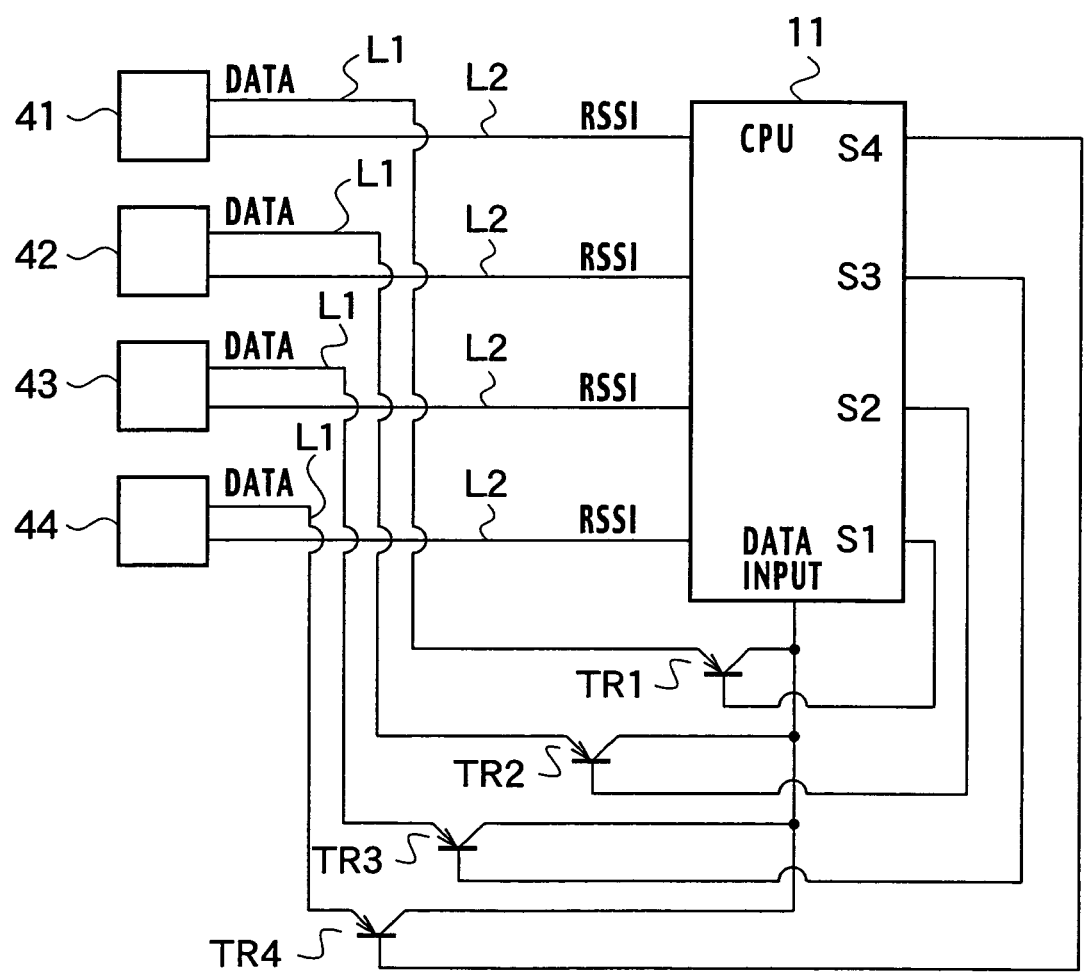
FIG. 3 is an explanatory view showing connections between receivers and a CPU in the tire pressure detecting apparatus.

FIG. 3 is a circuit diagram showing connections between the receivers 41 to 44 and a CPU 11 which is included in the ECU 5. The lines L1 extended from the receivers 41 to 44 are connected to a data input terminal of the CPU 11 through transistors TR1 to TR4 serving as switches. The lines L2 extended from the receivers 41 to 44 are connected to the CPU 11. The switches TR1 to TR4 are turned on and off in response to data switching signals S1 to S4 provided by the CPU 11.

Operation of the tire pressure detecting apparatus 1 according to the embodiment having the above-mentioned configuration will be explained.

When a system involving the tire pressure detecting apparatus 1 is turned on, a trigger (not shown) sequentially supplies a trigger signal to the terminals 31 to 34 on the tires at predetermined intervals. In response to the trigger signal, the terminals 31 to 34 one after another broadcast radio waves modulated by signals representative of tire pressure data. To avoid the terminals 31 to 34 from simultaneously transmitting signals to cause interference to signals, the trigger signal is supplied to the terminals 31 to 34 at different timing.

For example, the trigger signal is supplied to the terminals in the order of 31, 32, 33, and 34 so that the terminals 31, 32, 33, and 34 may one after another transmit a radio signal representing tire pressure data. The transmitted tire pressure data is received by the receivers 41 to 44, which transfer the received tire pressure data to the ECU 5.

A tire pressure data signal transmitted from, for example, the terminal 31 is received not only by the receiver 41 positioned in an area A (FIG. 1) involving the terminal 31 but also by the other receivers 42 to 44 arranged in areas B to D, respectively. The transmitted radio signal attenuates in proportion to distance, and therefore, the receiver 41 closest to the terminal 31 receives the signal with a strongest electric field. The RSSI 10 incorporated in each of the receivers 41 to 44 measures a level of a received signal which represents an electric field amplitude of the received signal or a power thereof. Since the receiver 41 is closest to the terminal 31, the RSSI 10 in the receiver 41 measures a highest electric field amplitude among the RSSIs 10 of the terminals 41 to 44.

The CPU 11 of FIG. 3 switches data to obtain in response to electric field strength signals provided by the receivers 41 to 44 through the lines L2. In the above example with the terminal 31 transmitting a tire pressure data signal, the receiver 41 provides the tire pressure data signal with a highest amplitude of electric field. The CPU 11, therefore, obtains the tire pressure data signal from the receiver 41 by issuing the switching signal S1 to the base of the transistor TR1.

As a result, only the transistor TR1 becomes conductive, and the other transistors TR2 to TR4 become nonconductive. Consequently, only the tire pressure data signal from the receiver 41 is supplied to the CPU 11.

Based on the supplied tire pressure data signal, the ECU 5 displays, on the display 6, the tire pressure data linked with the position in the vehicle of the tire corresponding to the tire pressure data. Such a linkage between obtained tire pressure data and a corresponding tire location is achievable by the ECU 5 because the obtained tire pressure data is uniquely linked with one of the receivers 41 to 44, which is uniquely linked with a tire location in the vehicle. Namely, in the above example, the obtained tire pressure data is linked with the receiver 41, which is linked with a unique tire location in the vehicle where the tire 21 that has transmitted the tire pressure data is fitted. As a result, a person in the vehicle can confirm, on the display 6, a tire pressure of each tire and the location of the tire in the vehicle.

Like the example mentioned above, a tire pressure of the tire 22 in the area B is detected by the terminal 32, which transmits a tire pressure data signal, accordingly. In this case, the receiver 42 in the area B receives the signal with a highest electric field amplitude. As a result, the CPU 11 issues the switching signal S2 to the base of the transistor TR2 shown in FIG. 3. Then, the CPU 11 obtains the air pressure data signal only from the receiver 42 and displays, on the display 6, the tire pressure data related to the position of the tire 22.

In the same manner, tire pressures of the tires 23 and 24 related to the positions thereof are displayed on the display 6. Consequently, the tire pressures of all tires 21 to 24 are related to the positions of the tires 21 to 24 in the vehicle and are displayed on the display 6.

Even in a case where a rotation is conducted to change the positions of the tires 21 to 24 in the vehicle, or replacement is carried out to alter the positions of the tires 21 to 24, the ECU 5 receives a tire pressure data signal of any one of the tires 21 to 24 from a corresponding one of the receivers 41 to 44 that is closest to the tire. The ECU 5, therefore, can correctly relate the received tire pressure data to the in-vehicle position of the tire that has transmitted the tire pressure data and can display the tire pressure data and the related tire position on the display 6.

In this way, the tire pressure detecting apparatus according to the embodiment arranges the receivers 41 to 44 for the tires 21 to 24, respectively. The ECU 5 selects one of the receivers 41 to 44 that provides a tire pressure data signal having a highest electric field amplitude, obtains the tire pressure data signal from the selected receiver, and displays the tire pressure data and the position of the tire that has provided the tire pressure data. Namely, the apparatus of the embodiment can display tire pressure data and the position of a tire in a vehicle that has provided the tire pressure data. Even if a tire rotation or replacement is conducted to change the positions of tires in a vehicle, the embodiment can correctly relate a detected tire pressure data to a tire position. Namely, instead of identifying a tire itself in a vehicle, the embodiment identifies the position of a given tire in a vehicle.

In a case where an abnormal tire pressure in a vehicle is detected, the embodiment can promptly notify a person in the vehicle of the abnormality and the position of the abnormal tire in the vehicle.

Figure 4:
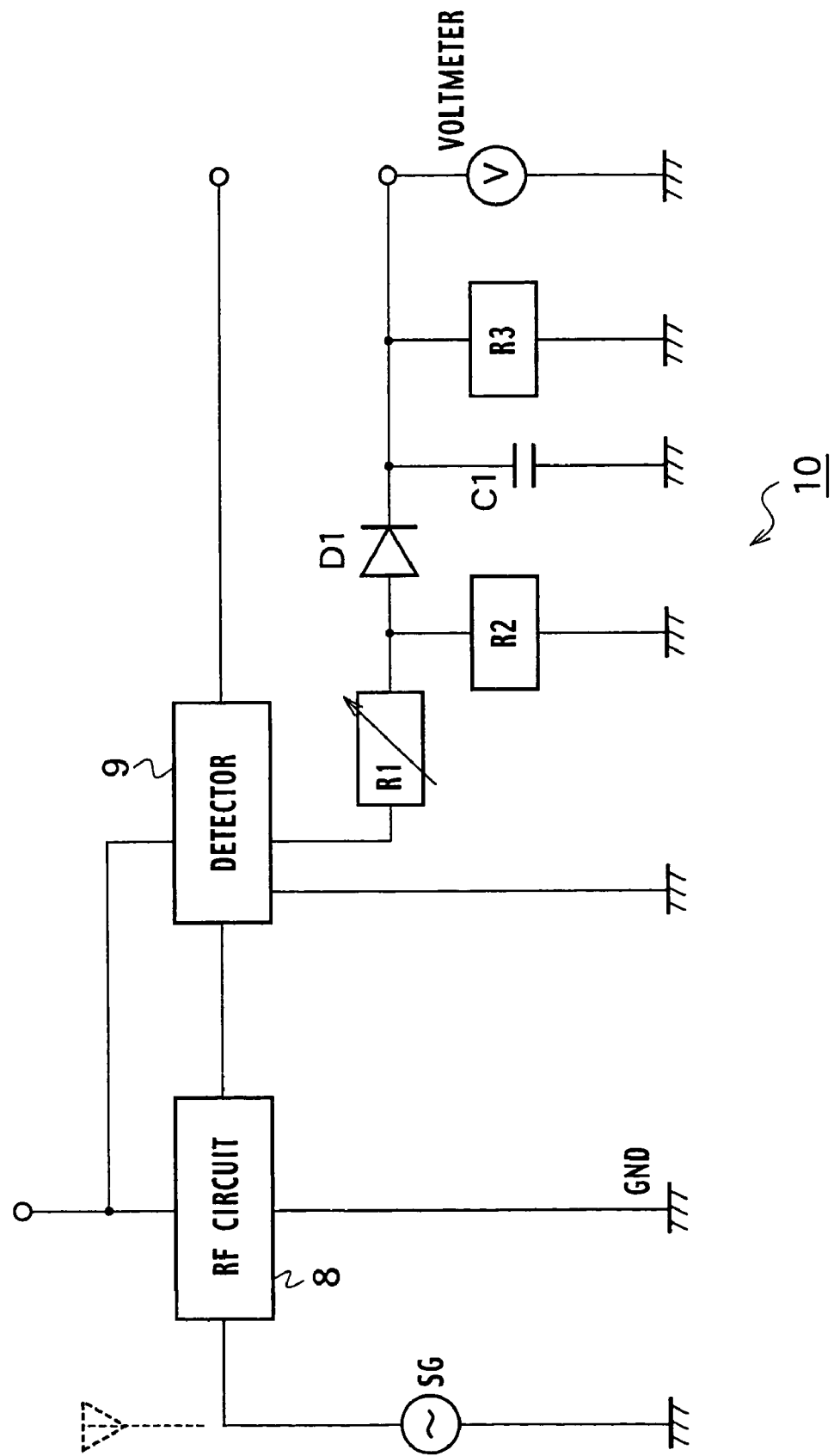
FIG. 4 is an explanatory view showing a circuit to form an output level of the receiver.

The receivers 41 to 44 usually involve individual differences or different installation environments so that the levels of electric fields detected at the RSSIs 10 of the receivers 41 to 44 may vary from one to another. In this case, the sensitivities of the receivers 41 to 44 are adjustable such that each of the receivers 41 to 44 can distinguish a signal level (amplitude) received from a corresponding one of the terminals 31 to 34 from signal levels received from the other terminals. Typically, as shown in FIG. 4, each of the receivers 41 to 44 is provided with a signal generator (SG) at an input stage and a voltmeter at an output stage, to adjust the variable resistor R1 of the voltage divider 111 serving as a level adjuster so that a fixed output signal is generated in response to a predetermined input signal. This configuration corrects variations in the sensitivities of the receivers 41 to 44.

Although the tire pressure detecting apparatus of the present invention has been explained with reference to the embodiment mentioned above, the present invention is not limited to the embodiment. Components of the tire pressure detecting apparatus explained above can optionally be replaced with other components having similar functions.

For example, the embodiment mentioned above involves a vehicle with four tires. The present invention is applicable not only to the vehicles with four tires but also to vehicles with optional numbers of tires (for example, two, six, or any other number of tires). The receiver may be arranged for every tire of a vehicle, or for some of the tires that are located at positions to be monitored. For example, a tire pressure detecting apparatus according to an embodiment of the present invention may employ at least two receivers in a vehicle.

There is a vehicle having two or more tires in each area defined in the vehicle. In this case, the area may be divided into sub-areas so that a receiver is arranged for each tire. Instead, information transmitted from a group of tires may be received by a single receiver. Namely, a receiver is provided to receive tire pressure data from at least one terminal installed on a tire. Such a case also falls within the scope of the present invention because each terminal is uniquely related to a receiver. If one of the tires provides abnormal tire pressure data, the present invention can specify the position or area of the abnormal tire in the vehicle and display the abnormal tire pressure data and the position of the abnormal tire in the vehicle.

According to the embodiment mentioned above, tire pressure data and tire positions of all tires of a vehicle are displayed on the display unit 6. This does not limit the present invention. For example, only an abnormal tire pressure and a corresponding tire position may be displayed when it is detected, or a detected tire pressure and position may be voiced.

As explained above, the tire pressure detecting apparatus according to the present invention arranges a receiver adjacent to each tire of a vehicle. The receivers transmit tire pressure data received from the tires. Based on the transmitted tire pressure data, a controller of the apparatus provides a person in the vehicle with the tire pressure of each tire related to the position of the tire in the vehicle. Accordingly, the person can confirm the tire pressure of each tire linked with the position thereof. The apparatus measures the levels of radio signals received at the receivers, obtains tire pressure data from the receiver with a highest radio signal level, and relates the obtained tire pressure data to the in-vehicle location of the tire that has transmitted the tire pressure data in question. This configuration of the tire pressure detecting apparatus can be materialized with a simple structure. Even if a rotation to change the positions of tires in a vehicle is conducted, the apparatus can correctly provide a person in the vehicle with tire pressures related to tire positions in the vehicle.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A tire pressure detecting apparatus for a vehicle, comprising:

at least two terminals, each of the terminals comprising:

a tire pressure sensor configured to detect a tire pressure; and a transmitter configured to transmit tire pressure data based on the detected tire pressure;

at least two receivers; and a controller, wherein each of the terminals is attached to a corresponding tire that is positioned in a respective area of the vehicle;

wherein each of the receivers is attached to a part of the vehicle corresponding to an associated tire, wherein each of the receivers is configured to: (a) receive and demodulate the tire pressure data transmitted by the transmitters; and (b) detect and transmit a reception level of the received and demodulated tire pressure data, wherein the controller is configured to identify the receiver that has the highest reception level, wherein the controller is configured to obtain the tire pressure data from the identified receiver, and wherein the controller is configured to relate the obtained tire pressure data with the tire associated with the identified receiver.

2. The tire pressure detecting apparatus of claim 1 further comprising:

a display that is configured to display the obtained tire pressure data and the location of the tire associated with the identified receiver in the vehicle.

3. The tire pressure detecting apparatus of claim 1, wherein each of the receivers comprises:

an RSSI circuit configured to detect the reception level.

4. The tire pressure detecting apparatus of claim 3, wherein each of the RSSI circuits comprises:

an attenuator that is configured to adjust the level of a received signal;

a rectifier; and a smoothing circuit.

5. A tire pressure detecting apparatus for a vehicle, comprising:

a plurality of terminals, wherein each of the terminals is positioned proximate a corresponding tire of the vehicle, wherein each of the terminals is configured to detect a tire pressure of the corresponding tire, wherein each of the terminals is configured to transmit a tire pressure signal corresponding to the detected tire pressure, and wherein each of the terminals comprises:

a tire pressure sensor configured to detect the tire pressure; and a transmitter configured to transmit the tire pressure signal based on the detected tire pressure;

a controller, wherein the controller is configured to identify the pressure in, and the location of, each of the tires; and a plurality of receivers, wherein each of the receivers is associated with a corresponding terminal, wherein each of the receivers is configured to: (a) receive and demodulate tire pressure signals transmitted by all of the transmitters; and (b) detect and transmit a reception level of each received and demodulated tire pressure signal.

6. The tire pressure detecting apparatus of claim 5, wherein, for any given tire pressure signal, the controller is configured to identify which receiver has the highest reception level.

7. The tire pressure detecting apparatus of claim 5, wherein, based on the signal received by the receiver that has the highest reception level, the controller is configured to obtain: (a) the pressure in the particular tire corresponding the signal; and (b) the location of the particular tire.

8. The tire pressure detecting apparatus of claim 1, wherein the tire pressure data is output from the identified receiver and is received by the controller as a demodulated analog or digital signal.

* * * * *